Dec. 11, 1928.　　　　　　　　　　　　　　1,694,482
　　　　　　　　　R. H. MORRIS, 3D
　　　　　　　　　　MUSHROOM BED
　　　　　　　　　Filed Aug. 20, 1925
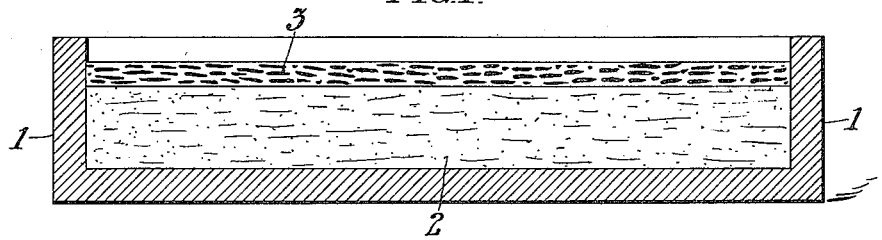
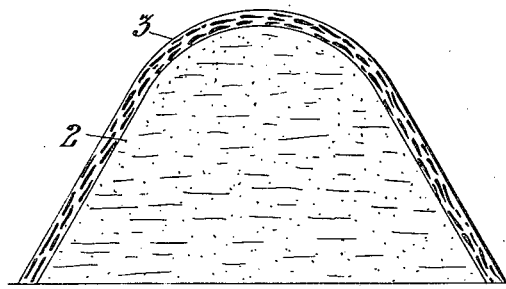 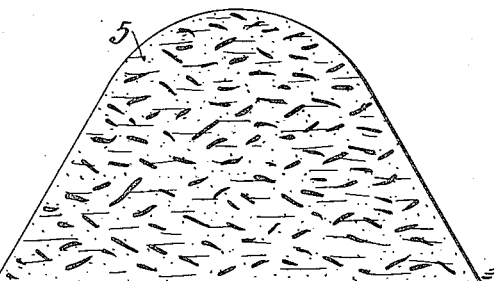
INVENTOR:
RICHARD HENRY MORRIS III, Patented Dec. 11, 1928.

1,694,482

UNITED STATES PATENT OFFICE.

RICHARD HENRY MORRIS, 3D, OF PHILADELPHIA, PENNSYLVANIA.

MUSHROOM BED.

Application filed August 20, 1925. Serial No. 51,331.

It is the ordinary practice of mushroom growers to prepare a bed for such growth by mixing ordinary loam with horse manure and straw. Such procedure is objectionable in that such a bed almost invariably includes germs of disease to which mushrooms are subject; for instance, what is termed the mycogone disease, which appears as a parasitic growth on the mushroom spawn.

It is the object and effect of my invention to not only provide a substitute for the ordinary loam aforesaid, but to include, in the soil of the bed, elements which are not only promotive of mushroom growth, but elements which are toxic with respect to the disease germs aforesaid.

My invention includes, not only a soil composition promotive of plant growth, but the various novel features of construction and arrangement thereon hereinafter more definitely specified.

In said drawings: Fig. I is a vertical sectional view of a casing containing an improved bed made in accordance with my invention.

Fig. II is a vertical sectional view of a compost pile illustrating an initial step in the process of forming my improved plant soil.

Fig. III is a vertical sectional view similar to Fig. II, but showing the final step in the formation of such soil.

The casing 1, which may be conveniently formed of lumber, is charged to a suitable depth, say five inches, with a mixture 2, of straw and horse manure. Upon the top of said mixture 2, I place a layer 3, say one and one half inches deep, when tamped, of a special composition including fibrous peat preferably of natural alkaline character, but which may be enhanced by the mixture of a calcium derivative therewith. Such tamping may be conveniently effected by means of a wooden block and is desirable because, if not tamped, the peat is so fluffy as to adhere to and render unsightly the caps of the mushrooms which grow up therethrough, and undue quantities of the peat are dislodged by attempts to pick the mushrooms from the bed unless the peat has been thus tamped. It is to be noted that it is practically impossible to tamp the peat to the desired degree of firmness, unless it contains more than sixty percent water. I have found it advantageous to employ peat taken from such depth in a natural deposit as to be of coarse fibrous composition, and brown in color. Such peat will hold about four times as much water as ordinary loam, and should contain about seventy-five percent water, for inclusion in the compost. Such deep peat has certain antiseptic properties which render it rather toxic to higher plants and grasses, but render it preferable for mushrooms. However, I prefer to break up the coarser fibers of such peat in mixing the same with any supplemental alkaline material and with toxic material aforesaid, which may be bichloride of mercury or formalin or a phenol derivative.

Although I prefer to form a bed of two distinct layers, as above described with reference to Fig. I; and to sow the mushroom spawn upon the bottom layer, before applying the top layer thereto; I do not desire to limit myself to such construction, arrangement, or procedure. For instance, as indicated in Fig. II; a pile of the compost 2, say four feet deep, may be covered with a layer of the composition 3, say three inches deep; and the mass be then turned to thoroughly mix the same; and such operation be repeated several times. Of course, the effect of that operation is to distribute the alkaline peat and toxic material throughout the entire mass substantially uniformly, as indicated in Fig III, where the aggregate is indicated at 5. A mushroom bed may be formed of such aggregate 5, by placing the same in a suitable casing, such as indicated at 1 in Fig. I. In the latter case the mushroom spawn or other plant spores, or seeds, may be distributed at or below the surface of the bed.

The effect of either procedure above described is to not only suppress the disease germs which ordinarily attack mushrooms, but to very materially facilitate the growth of mushrooms and other plants cultivated in such beds.

It is much easier to case a mushroom bed with the peat layer aforesaid than with loam, because it spreads easier and does not puddle when wet. My peat casing material can be stored in the open air, whereas, loam which has to be screened to get it to a pulverulent form, must be kept under cover.

Such peat casing material is advantageous as compared with ordinary dirt or loam casing; first, it induces a greater growth of mushrooms. Second, it hastens the maturity of the mushroom crop, to such a degree that two crops may be grown in succession, in the length of time ordinarily required to grow one crop under a dirt casing. Third, the mushrooms are lighter in color and, consequently, more readily marketable.

The toxic compounds above mentioned not only destroy the disease germs, but encourage the fruition of the mushroom plant. The latter effect is so marked that all such plants tend to mature earlier and reproduce when conditions are unfavorable for vegetative growth. Extreme moisture tends to encourage extreme vegetative growth to the neglect of proper fruition, unless there is lime or toxic material present to encourage reproduction.

Mushrooms, although requiring considerable water, are injured, to the extent that their growth is temporarily checked, every time they are watered. Consequently, the employment of peat having capacity to suspend and render available a large percentage of moisture in the bed, avoids the frequent watering required where ordinary dirt is employed as a bed casing material.

Therefore, I do not desire to limit myself to the precise construction, arrangement, or procedure, herein set forth, as it is obvious that various modifications may be made therein without departing from the essential features of my invention, as defined in the appended claims.

I claim:

1. In a mushroom bed, the combination with a casing; of a layer of compost including a mixture of straw and horse manure in said casing; a top layer, upon said mixture including fibrous brown peat, of alkaline character, mixed with a calcium derivative and a material having a toxic effect upon plant disease germs; such toxic material including bichloride of mercury.

2. A mushroom bed including a compost containing fertilizing material, associated with a mixture of fibrous peat and a material toxic with respect to mushroom disease germs.

In testimony whereof, I have hereunto signed my name at Philadelphia, Pennsylvania, this eleventh day of August, 1925.

RICHARD HENRY MORRIS III.